May 30, 1967  A. S. KUCHTA  3,322,912
SELF-ADJUSTING ROTARY ELECTRICAL SWITCH
Filed Jan. 11, 1966  2 Sheets-Sheet 1
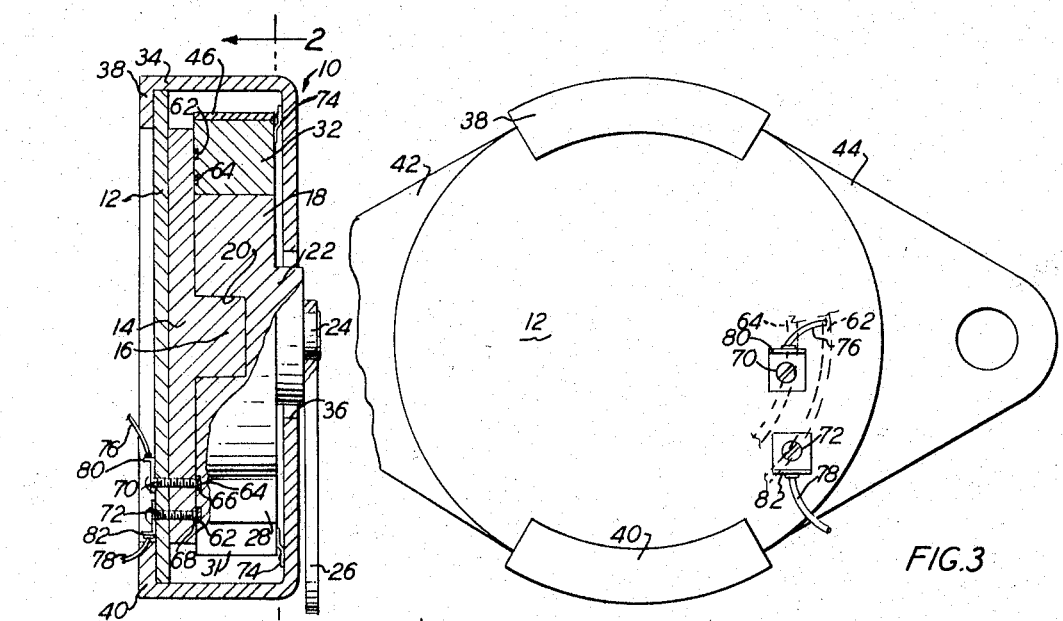
FIG. 1
FIG. 3
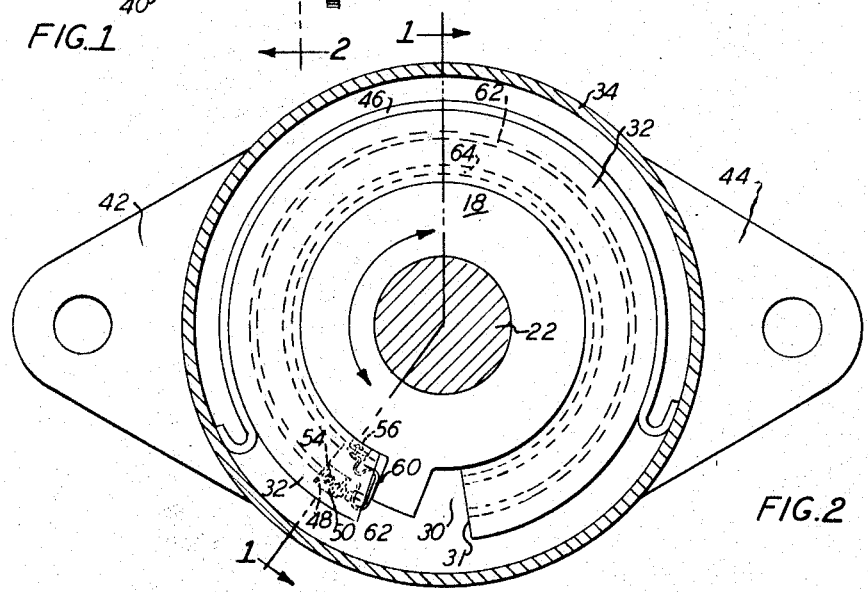
FIG. 2
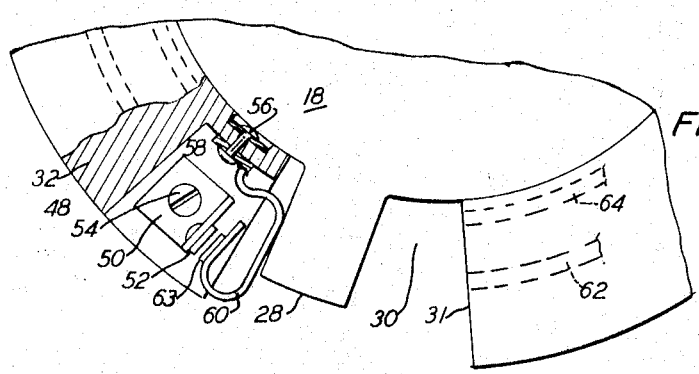
FIG. 4
ANTHONY S. KUCHTA
INVENTOR.
BY John R. Faulkner
Keith L. Zerschling
ATTORNEYS May 30, 1967   A. S. KUCHTA   3,322,912
SELF-ADJUSTING ROTARY ELECTRICAL SWITCH
Filed Jan. 11, 1966   2 Sheets-Sheet 2

ANTHONY S. KUCHTA
INVENTOR.

BY John R. Faulkner
Keith L. Zerschling
ATTORNEYS

United States Patent Office 3,322,912
Patented May 30, 1967

3,322,912
SELF-ADJUSTING ROTARY ELECTRICAL
SWITCH
Anthony S. Kuchta, Dearborn, Mich., assignor to Ford
Motor Company, Dearborn, Mich., a corporation of
Delaware
Filed Jan. 11, 1966, Ser. No. 519,882
5 Claims. (Cl. 200—61.39)

This invention relates to an electric switch and in particular to a self-adjusting electric switch of circular design.

Wide usage exists in the current electro-mechanical arts of electrical switches actuated by the mechanical movement of machine elements. Design problems are encountered where it is desirable for a switch condition to be changed by a predetermined degree of movement of a machine element in a first direction and where this element must accommodate varying degrees of movement in a second (reverse) direction.

An example of this problem may be seen by reference to a speed control system for a motor vehicle. Such a system includes an electrical circuit, which, when energized, maintains the throttle setting at a predetermined level. It is necessary that this circuit be de-energized upon the slightest movement of the vehicle brake pedal by opening a switch. The magnitude of brake pedal movement varies greatly, being dependent upon such variables as the degree of deceleration desired by the operator, brake wear and the temperature of brake elements. Due to considerations of safety and reliability, the mechanisms connecting the brake pedal and the speed control energizer to the switch often must be direct mechanical connections. Yet, after being opened due to brake pedal movements of various magnitudes, the switch must be capable of being closed by a constant, predetermined mechanical movement of the energizing element, such as a lever in the passenger compartment of the vehicle.

It is, therefore, the object of this invention to provide a self-adjusting electrical switch that may be opened by mechanical stimuli of varying magnitudes and closed by a predetermined, constant mechanical movement.

A further object of this invention is to provide a self-adjusting electrical switch that is of simple design and is reliable in operation.

A self-adjusting electrical switch incorporating this invention includes a rotatable actuating shaft that may be connected to a switch control mechanism. An integrally formed tab protrudes radially from the shaft. A hollow, annular switch block partially surrounds the shaft. This switch block member is rotatable and has a slot of greater width than the tab extending through a portion of said member. The shaft and switch block member are assembled so that the tab is located in the slot. A pair of contacts are positioned on the rotating parts so as to be opened and closed by relative rotation between the shaft and the switch block member. A housing surrounds the switch block member and an annular drag spring bears on these two parts to partially retard the rotation of the member. Electrical connection between the contacts and conductors located exteriorly of the switch is provided by conductive bands in circuit with the contacts and formed in the bodies of the rotating parts. Stationary contact heads to which the exterior conductors are connected, bear against said bands at all times.

Further objects and advantages of this invention will become more apparent from the following description, particularly when considered in conjunction with the accompanying drawings wherein:

FIGURE 1 is an elevational view of a switch constructed according to the invention and taken along line 1—1 of FIGURE 2 with part broken away and part in section;

FIGURE 2 is a cross sectional view taken along line 2—2 of FIGURE 1;

FIGURE 3 is a rear view of the switch of FIGURES 1 and 2;

FIGURE 4 is an enlargement of a portion of FIGURE 2;

Figure 5:
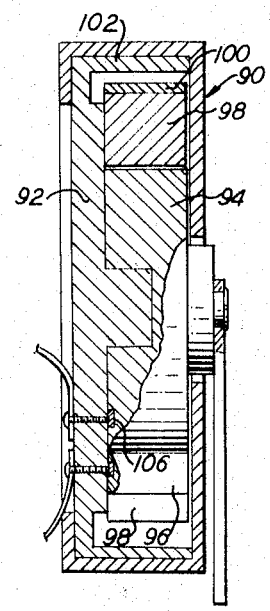
FIGURE 5 is a view similar to FIGURE 1 but showing another embodiment of this invention.

Referring now in detail to the drawings and in particular to the embodiment shown in FIGURES 1–4, a self-adjusting electrical switch is indicated generally by the reference numeral 10. The switch 10 includes a back plate 12 and a pilot plate 14 having a central annular pilot projection 16. A rotatable actuating shaft 18 is mounted on projection 16 via central recess 20 formed in the body of shaft 18. Shaft 18 has a portion 22 of reduced size that carries a projection 24. Link 26 of the switch actuating mechanism is attached to projection 24. This mechanism may be of any design complementary to the environmental usage of the switch. In the speed control system example given above, the actuating mechanism would connect projection 24 to a vehicle brake pedal so that shaft 18, as shown in FIGURE 2, would rotate counterclockwise upon depression of the pedal. Link 26 would also be connected by a suitable actuating mechanism to the speed control energizing switch. These actuating mechanisms are described only for purposes of example and do not constitute any part of the present invention and may be of any conventional design.

Tab 28 is formed on shaft 18 and protrudes into a slot 30 that extends through a portion of an annular rotatable switch block 32. Slot 30 has a side wall 31. Plate 14, shaft 18, and member 32 are designed to permit free rotation of shaft 18 and member 32.

A housing 34 encloses the switch assembly and accommodates the reduced portion 22 of shaft 18 by means of aperture 36. Ears 38 and 40 are formed integral with housing 34 and are deformed around back plate 12 during assembly of the switch. Mounting brackets 42 and 44 are also formed integral with housing 34 to facilitate the mounting of the switch. Drag spring 46 is located between housing 34 and switch block member 32 and bears against these two elements to retard rotational movement of member 32.

Referring now in particular to FIGURE 4, there can be seen a recess 48 in member 32. Contact mount 50, carrying contact 52, is attached to one wall of recess 48 by a suitable fastener 54. Attached to a second wall of recess 48 by fastener 56 is bracket 58 which carries spring 60 and contact 63. Spring 60 is such that contacts 52 and 63 are normally biased open. Spring 60 extends into slot 30 so that tab 28 will force contact 63 into engagement with contact 52 upon clockwise movement of shaft 18 relative to member 32.

Mount 50 and bracket 58 are electrically conductive and are connected to conductive bands 62 and 64 located in recesses in the rear surface of member 32. Contact heads 66 and 68, formed on conductive screws 70 and 72 respectively, bear against bands 62 and 64. This contact between bands 62 and 64 and heads 66 and 68 is constant due to the leaf springs 74, of which there may be any number (two shown), located on the inside front wall of housing 34. Leaf springs 74 press member 32 against plate 14. External conductors 76 and 78 may be suitably attached to terminals 80 and 82 which are held by screws 70 and 72 respectively.

The operation of the switch in the environment of the vehicle speed control example detailed above is as follows.

The switch is connected in series circuit with the speed control circuit. Upon movement of the speed control lever to the "on" position, link 26 forces rotation of shaft 18 in a clockwise direction. Tab 28 then presses against spring 60. Drag spring 46 is of sufficient strength to retard rotation of member 32 thereby allowing the force of spring 60 to be overcome by tab 28. This action closes contacts 52 and 63. The switch remains in this attitude until the vehicle operator depresses the brake pedal. Pedal movement is transmitted by the conventional mechanism described above to force rotation of shaft 18 in a counterclockwise direction. Tab 28 will then no longer bear against spring 60 and the contacts 52 and 63 will become open. Continual movement of the brake pedal will force tab 28 into engagement with side wall 31 of slot 30. The force of drag spring 46 will be overcome and member 32 will rotate in unison with shaft 18. It may thus be seen that regardless of the magnitude of pedal movement causing the contacts to open, a constant, short clockwise rotation of shaft 18 is sufficient to re-energize the speed control circuit by closing contacts 52 and 63.

Figure 6:
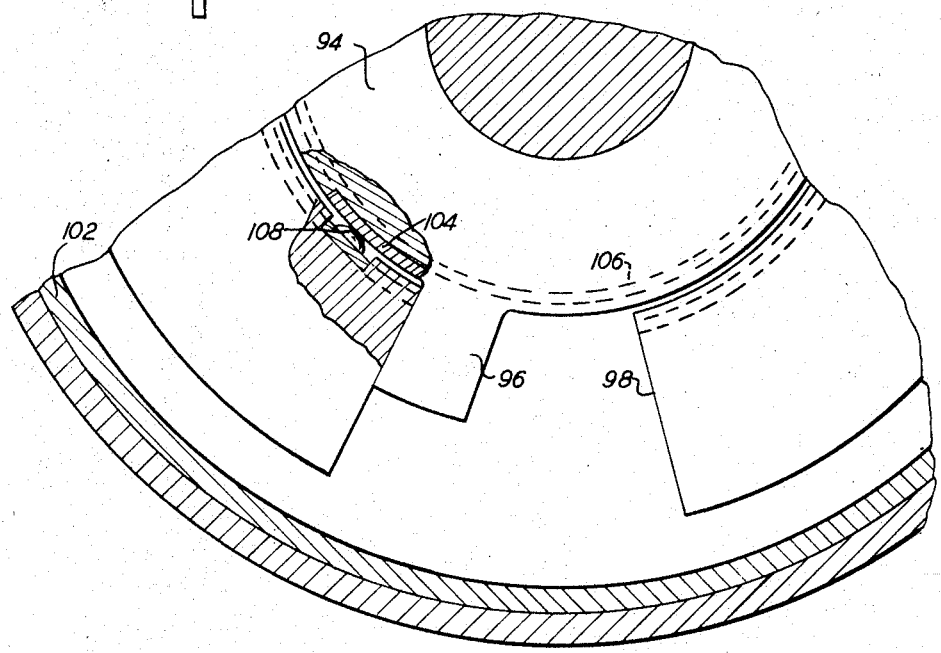
FIGURE 6 is a view similar to FIGURE 4, but showing a portion of the switch of FIGURE 5.

Referring now to FIGURES 5 and 6, the numeral 90 indicates a self-adjusting electrical switch constructed according to another embodiment of this invention. Pilot plate 92 mounts freely rotatable actuating shaft 94 having tab 96. Shaft 94 is partially surrounded by switch block member 98, the rotation of which is retarded by drag spring 100 located between member 98 and projection 102 of plate 92.

Flat contact 104 is positioned in a recess formed in shaft 94 proximate to tab 96. Contact 104 is electrically connected to conductive band 106. Annular contact 108 is positioned in a recess in member 98 and is in electrical contact with conductive band 110 positioned in the rear surface of shaft 94.

It is apparent that switch 90 operates in the same manner as switch 10 and yields the same advantages.

It is to be understood that this invention is not limited to the exact construction shown and described, but that various changes and modifications may be made without departing from the spirit and scope of the invention as defined by the appended claims.

I claim:
1. A self-adjusting electrical switch including a rotatable actuating shaft, a rotatable hollow annular member partially surrounding said shaft, a tab protruding radially from said shaft, said member having formed therein proximate said shaft an opening of greater width than said tab, said tab being located in said opening and causing unitary rotation of said shaft and said member after permitting limited rotation of said shaft, a pair of electrical contacts, one of said contacts carried by said member so that rotation of said shaft will open and close said contacts, two electrically conductive bands carried by said member and in circuit with said contacts, and a pair of conductors, each of said conductors being in constant contact with one of said bands.

2. A self-adjusting electrical switch according to claim 1 and including a switch housing surrounding said member and resilient means retarding the rotation of said member between said housing and said member.

3. A self-adjusting electrical switch according to claim 1 wherein said one contact is mounted on the inner surface of said member and the other contact is mounted on the opposing surface of said shaft.

4. A self-adjusting electrical switch according to claim 1 and including resilient means extending into said opening and mounting the other of said contacts on said member and biasing said contacts out of engagement, said tab bearing against said resilient means to close said contacts upon rotation of said shaft in one direction.

5. A self-adjusting electrical switch according to claim 4 wherein said one contact is fixedly mounted relative to said member.

References Cited
UNITED STATES PATENTS

| | | | |
|---|---|---|---|
| 2,232,750 | 2/1941 | Wilson | 200—61.46 |
| 2,920,156 | 1/1960 | Rice et al. | 200—61.39 |
| 3,233,053 | 1/1966 | Parks | 200—61.39 |

BERNARD A. GILHEANY, *Primary Examiner.*

J. J. BAKER, H. E. SPRINGBORN, *Assistant Examiners.*